(12) United States Patent
Handlin et al.

(10) Patent No.: US 6,699,941 B1
(45) Date of Patent: Mar. 2, 2004

(54) BLOCK COPOLYMER

(75) Inventors: Dale L. Handlin, Houston, TX (US); David T. Williamson, Christianburg, VA (US); Carl L. Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 16 days.

(21) Appl. No.: 10/289,833

(22) Filed: Nov. 7, 2002

(51) Int. Cl.[7] ............... C08F 279/00; C08F 293/00; C08F 255/06; C08F 2/00
(52) U.S. Cl. ............ 525/313; 525/314; 525/315; 525/316; 526/79
(58) Field of Search ............ 526/79; 525/313, 525/314, 315, 316

(56) References Cited

U.S. PATENT DOCUMENTS

| | | |
|---|---|---|
| 3,149,182 A | 9/1964 | Porter |
| 3,494,942 A | 2/1970 | Miki et al. |
| RE27,145 E | 6/1971 | Jones |
| 3,595,942 A | 7/1971 | Wald et al. |
| 3,634,594 A | 1/1972 | Hivama |
| 3,670,054 A | 6/1972 | De la Mare et al. |
| 3,700,633 A | 10/1972 | Wald et al. |
| 3,985,830 A | 10/1976 | Fetters et al. |
| 4,020,251 A | 4/1977 | Hsieh |
| 4,127,710 A | 11/1978 | Hsieh |
| 4,131,653 A | 12/1978 | Hsieh et al. |
| 4,138,536 A | 2/1979 | Hsieh |
| 4,179,480 A | 12/1979 | Hsieh |
| 4,237,246 A | 12/1980 | Hsieh |
| 4,391,949 A | 7/1983 | St. Clair |
| 4,444,953 A | 4/1984 | St. Clair |

FOREIGN PATENT DOCUMENTS

| | | |
|---|---|---|
| CA | 716645 | 8/1965 |
| EP | 0014947 A1 | 9/1980 |

OTHER PUBLICATIONS

Lefebvre, G. and Dawans, F., 1,3–Cyclohexadiene Polymers. Part I. Preparation and Aromatization of Poly–1, 3–cyclohexadiene, Journal of Polymer Science: Part A, vol. 2, 3277–3295 (1964).

Mango, L. and Lenz, R., Organometallic Reactions which Control Molecular weight in the Anionic Polymerization of 1,3–Cyclohexadiene, Polymer Prep. (Amer. Chem. Soc. Div. Polym. Chem.), 402–409 (1971).

Natori, Itaru, Synthesis of Polymers with an Alicyclic Structure in the Main Chain. Living Anionic Polymerization of 1,3–Cyclohexadiene with the n–Butyllithium/N,N,N', N'–Tetramethylethylenediamine System, Macromolecules, vol. 30, 3696–3697 (1997).

Natori, 1. and Inoue, S., Living Anionic Polymerization of 1,3–Cyclohexadiene with the n–Butyllithium/N,N', N'–Tetramethylethylenediamine System. Coloplymerization and Block Copolymerization with Strrene, Butadiene, and Isoprene, Macromolecules, vol. 31, 982–987 (1998).

*Primary Examiner*—Morton Foelak

(57) ABSTRACT

The present invention relates to selectively hydrogenated block copolymers where one of the blocks is a random copolymer of a mono-alkenyl arene monomer, such as styrene, and a 1,3-cyclodiene monomer, such as 1,3-cyclohexadiene, and one of the other blocks is a hydrogenated polymer or copolymer of an acyclic conjugated diene, such as 1,3-butadiene or isoprene.

20 Claims, 3 Drawing Sheets

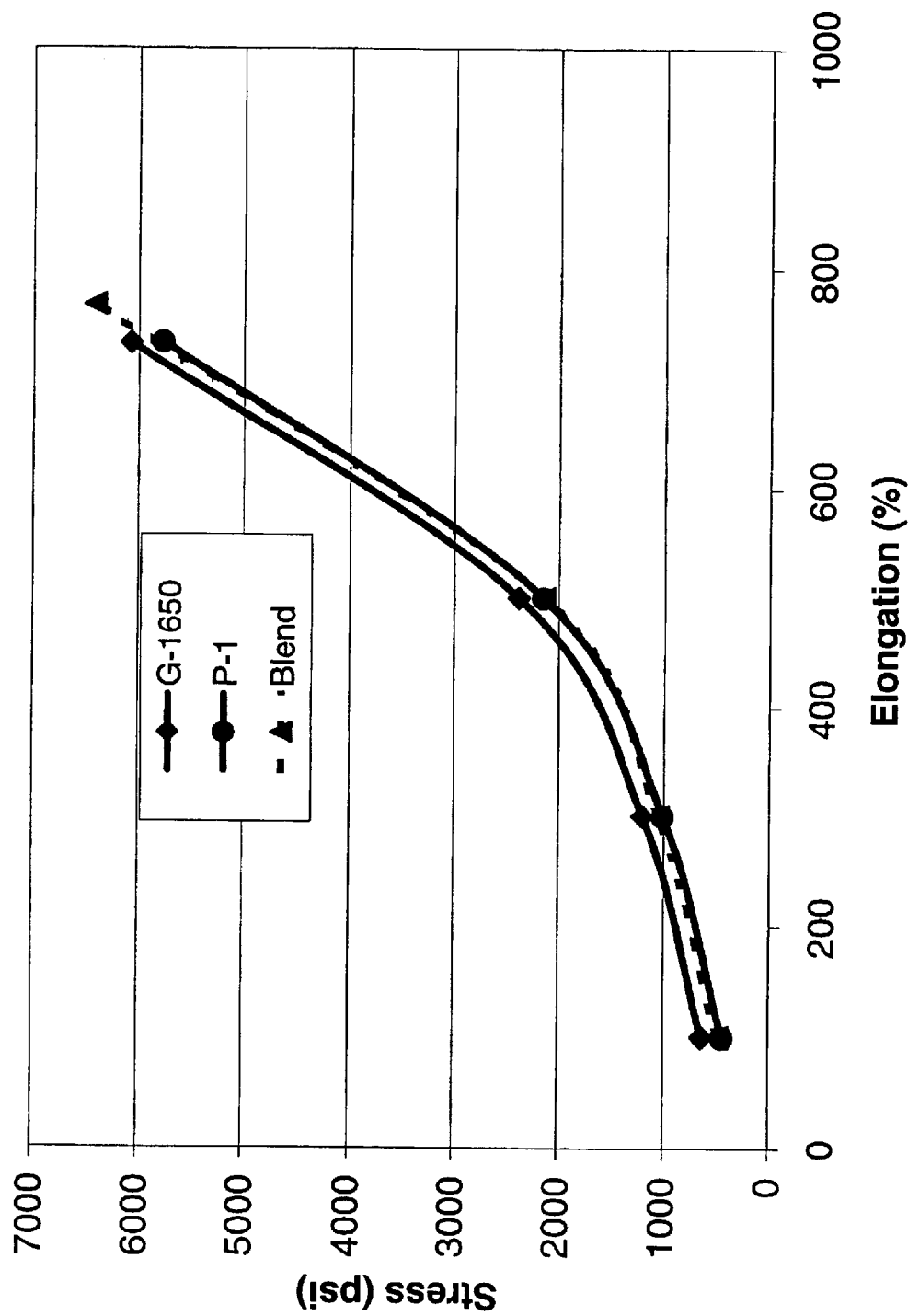

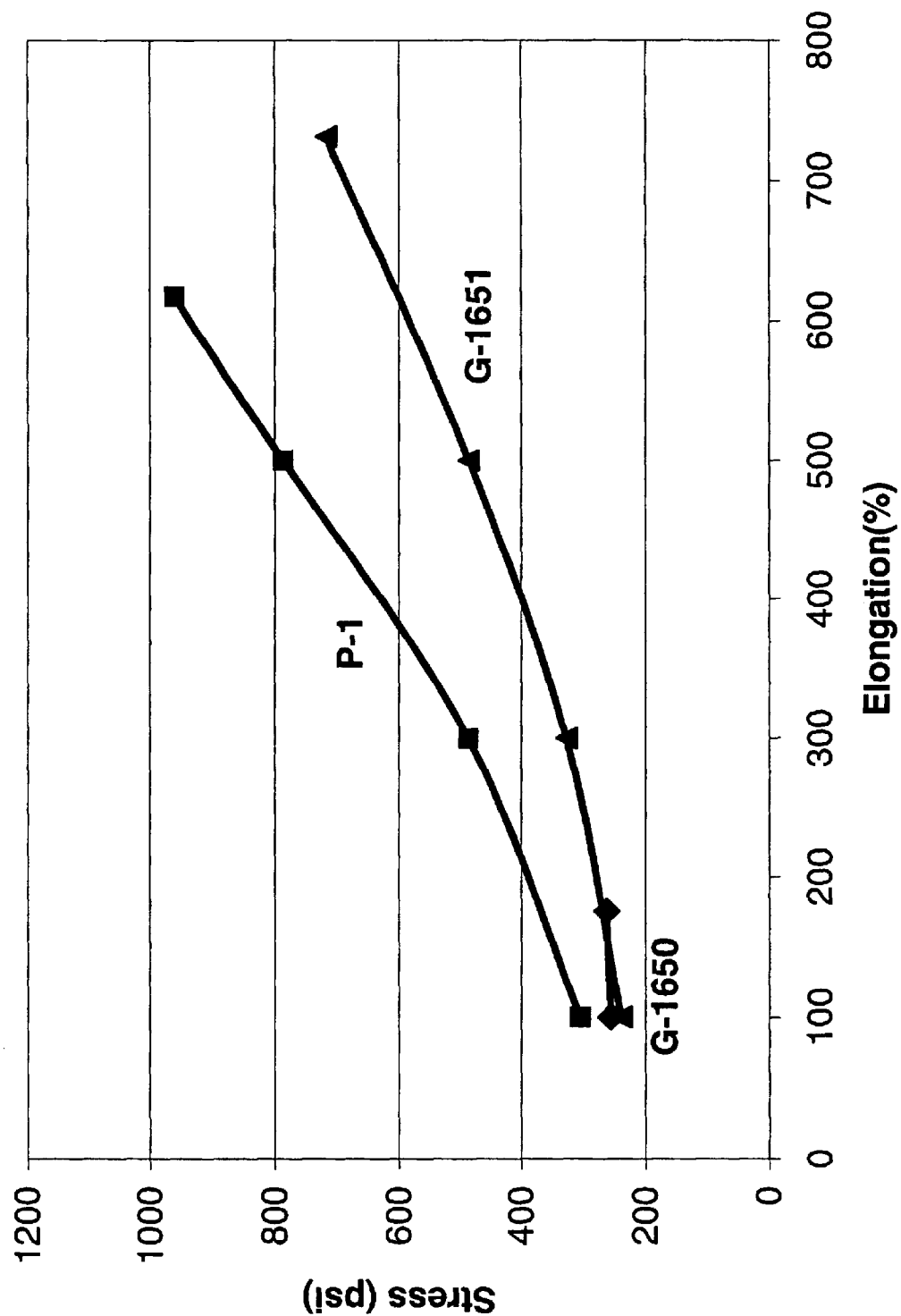

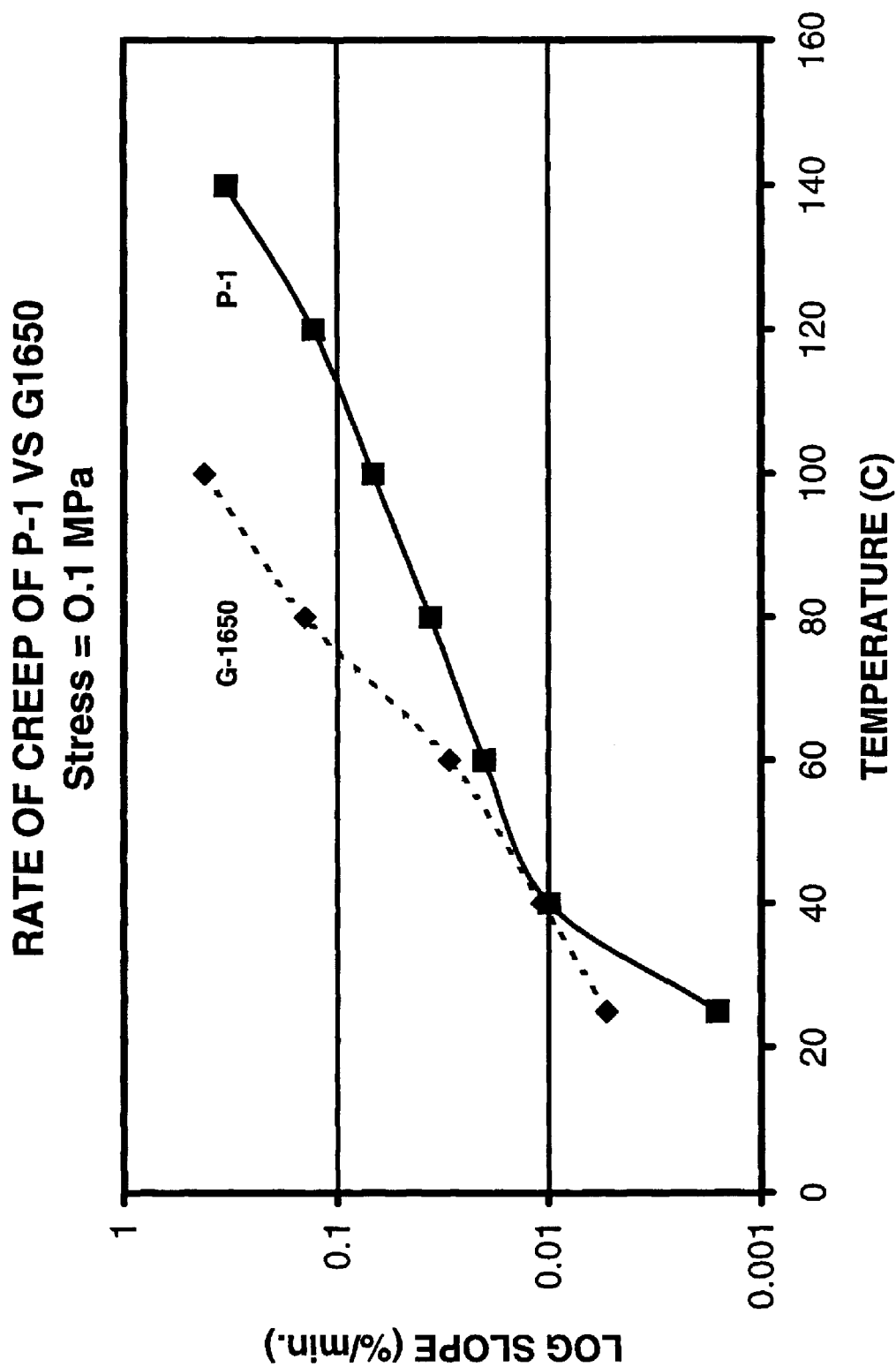

BLOCK COPOLYMER

FIELD OF THE INVENTION

The present invention relates to selectively hydrogenated block copolymers where at least one of the blocks is a random copolymer of a mono-alkenyl arene monomer, such as styrene, and a 1,3-cyclodiene monomer, such as 1,3-cyclohexadiene, and at least one of the other blocks is a hydrogenated polymer or copolymer of an acyclic conjugated diene, such as 1,3-butadiene or isoprene.

BACKGROUND OF THE INVENTION

The preparation of styrene-diene block copolymers is well known. One of the first patents on linear ABA block copolymers made with styrene and butadiene is U.S. Pat. No. 3,149,182. These polymers in turn could be hydrogenated to form more stable block copolymers, such as those described in U.S. Pat. Nos. 3,595,942 and Re. 27,145. Over the years such styrene based thermoplastic elastomers have been used in a large number of applications and end-uses. However, for some of these end uses it is necessary that the polymer have good mechanical properties at elevated application or service temperatures, and the existing styrene-diene block copolymers have some deficiencies in that regard. One approach to improve the upper service temperature of such polymers is to increase the glass transition temperature ($T_g$) of the end-blocks of the polymer. An example of that approach has been the hydrogenation of the poly (styrene) blocks in a styrene-diene block copolymer. The poly (vinylcyclohexane) endblocks exhibit an increased $T_g$ that occurs at 145° C., which is a 50° C. increase in the $T_g$ of conventional poly (styrene) endblocks. Unfortunately, this process requires hydrogenation at elevated temperatures, which adds cost to the manufacturing process. Additionally, high temperature hydrogenation can lead to hydrogenolysis of the C—C bonds of the polymer backbone; such a chain degradation mechanism affords polymers having reduced mechanical performance, poorer strength, despite the high $T_g$ of the polyvinylcyclohexane blocks. There are other disadvantages with that approach; following exhaustive hydrogenation, the block copolymer is a completely aliphatic, amorphous material and as such has poor oil resistance. The driving force for phase separation in these polymers is reduced as polyvinylcyclohexane is more compatible with an hydrogenated diene rubber than is polystyrene. Because block copolymers rely on phase separation as the mechanism for strength formation, hydrogenation of the polystyrene block reduces strength.

What is needed is a new approach to increase the $T_g$ of such poly(styrene) block copolymers, that does not have such other detrimental process disadvantages and offers a product with a better balance of properties.

SUMMARY OF THE INVENTION

Accordingly, the present invention relates to a hydrogenated block copolymer having the general configuration A—B,
A—B—A,
A—B—A',
(A—B)$_n$X, where n is an integer from 2 to about 30, and X is coupling agent residue, or
A—B—C and wherein
  a. prior to hydrogenation each A and A' block is a random copolymer of an alkenyl arene monomer and a 1,3-cyclodiene monomer, each B block is a polymer block of at least one acyclic conjugated diene, and each C block is a polymer block of an alkenyl arene monomer;
  b. subsequent to hydrogenation about 0–10% of the arene double bonds in the A, A' and C blocks have been reduced, at least about 90% of the conjugated diene double bonds in the B blocks have been reduced, and at least about 90% the 1,3-cyclodiene double bonds in the A and A' blocks have been reduced;
  c. each A, A' and C block having an average molecular weight between about 3,000 and about 60,000 and each B block having an average molecular weight between about 30,000 and about 300,000;
  d. the weight ratio of alkenyl arene monomer to cyclodiene monomer in each A and A' block is between 1:1 and 99:1;
  e. the total amount of A, A' plus C blocks in the hydrogenated block copolymer is above 10%, preferably about 15 percent weight to about 80 percent weight; and
  f. the glass transition temperature for the hard phase of the block copolymer is in excess of 105° C.

The polymers of the current invention have surprisingly improved creep properties at all temperatures, but particularly are improved at temperatures above 60° C. when compared with a traditional block copolymer known in the art. This improvement in higher temperature performance is achieved without increasing the polarity of the A block. In order to achieve these higher temperature properties, it is important that the cyclodiene be copolymerized in a nearly random way with styrene. If the monomers form separate blocks, the Tg of the styrene block will not be increased, whereas a random copolymer will result in an increase of the polystyrene Tg in proportion to the fraction of added cyclodiene. The randomness of the copolymerization may be characterized in terms of the average number (N) of consecutive cyclodiene repeat units in the copolymer (a number that can be measured using a Proton Nuclear Magnetic Resonance (H-NMR) method). To avoid getting a copolymer having separate polystyrene and polycyclodiene Tg responses, it is preferred to have less than 10, on average, consecutive cyclodiene repeat units in the copolymer (N<10). It is more preferred to have N<5. Such a copolymer segment will have an even more random structure.

In still another aspect of the present invention the polymers of the current invention may be blended with polyolefins and, optionally, process oils to form compounds which have improved high temperature performance when compared to blends with traditional styrenic block copolymers. With traditional block copolymers, properties of these compounds, such as compression set at elevated temperature, for example 70° C. and 100° C., are improved to a limited extent by increasing the molecular weight of the polystyrene block. By using the polymers of the current invention the properties for an equivalent styrene block molecular weight will be improved. Alternatively, a lower styrene/cyclodiene block molecular weight could be chosen to give the same properties as the traditional block copolymer. Polymers of the current invention with the lower molecular weight A block would have improved processability compared to the traditional styrene end block. Because of their improved temperature performance the polymers of the current invention have application in molded or extruded goods which experience high temperature environments such as automotive applications and which require high temperature sterilization such as medical and personal hygiene products. The resulting soft compound may also be used in over-molding applications onto a wide range of thermoplastic polymer substrates. Improved creep at body temperature will also make these polymers advantaged for personal hygiene applications such as elastic articles in diapers and clothing.

These applications may employ either the block copolymer by itself, or preferably, blends of the block copolymer with polyolefins, polyphenylene oxides, styrenic resins and optionally process oils. Suitable polyolefins would be chosen from the group of polypropylene homopolymers, polypropylene copolymers, polyethylene homopolymers, and polyethylene copolymers with olefins and with vinyl acetate or acrylic monomers. Styrenic resins would include polystyrene, ABS, HIPS, and high styrene random and block copolymers.

BRIEF DESCRIPTION OF THE DRAWINGS

FIG. 1 shows the Tensile properties at 23° C. for the presently claimed polymer compared to a conventional hydrogenated styrene-butadiene block copolymer, and compared to a 50:50 blend of the two polymers.

FIG. 2 shows the tensile properties at 75 to 80° C. for the presently claimed polymer compared to two different conventional hydrogenated styrene-butadiene block copolymers.

FIG. 3 shows the rate of creep as a function of temperature for films of P-1 compared to a commercial S-EB-S polymer, KRATON G-1650.

The rate of creep near room temperature is similar for the two polymers, however, above 60° C. the P-1 film shows significantly lower creep rates. At 100° C. the G-1650 sample failed, whereas, the P-1 could be tested up to 140° C. with lower creep than was observed for G-1650 at 100° C.

DETAILED DESCRIPTION OF THE INVENTION

There are three different groups of monomers that are used to make the thermoplastic block copolymers of the present invention: these groups are (a) mono alkenyl arenes, (b) acyclic conjugated dienes, and (c) 1,3-cyclodienes.

The preferred acyclic conjugated dienes that can be polymerized into the polymer block B are those containing 4 to 12 carbon atoms. Examples for such conjugated dienes are 1,3-butadiene, 2,3-dimethyl-1,3-butadiene, piperylene, 3-butyl-1,3-octadiene, isoprene, 2-phenyl-1,3-butadiene. The preferred acyclic dienes are 1,3-butadiene and isoprene.

Mono alkenyl arenes that can be polymerized together with the cyclic dienes to form the polymer block A preferably are those selected from the group of styrene, the methylstyrenes, particularly 4-methylstyrene and alpha-methylstyrene, the propylstyrenes, particularly 4-propylstyrene, the butyl styrenes, particularly p-t-butylstyrene, and vinylnapthalene, particularly 1-vinylnapthalene, cyclohexylstyrenes, particularly 4-cyclohexylstyrene, p-tolylstyrene, and 1-vinyl-5-hexylnaphthalene. The preferred mono alkenyl arene is styrene.

The 1,3-cyclodienes used in the present invention are represented by the formula

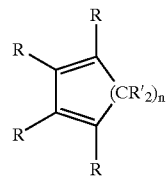

where n can be 2 or greater, each R group can be a hydrogen, alkyl or aryl, and each R' group can be a hydrogen, alkyl, linear or branched or a cycloalkyl, or aryl radical such that the maximum number of carbon atoms per R' group is about 6. Both the R and R' groups can be the same or different radicals selected from their respective group. The total number of carbon atoms in the 1,3-cyclodiene monomer can be in the range of from about 6 to 20. Examples of such compounds include 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene, 1-methyl-5-cyclohexyl-1,3-cyclohexadiene, 1,3-cycloheptadiene, and 1,3-cyclooctadiene. The preferred cyclodienes are 1,3-cyclohexadiene, 1,3-cycloheptadiene and 1,3-cyclooctadiene. The most preferred is 1,3-cyclohexadiene.

An important aspect of the present invention is the ratio of 1,3-cyclodiene to mono alkenyl arene monomer in the A and A' block. The weight ratio of cyclodiene to monoalkenyl arene in each A and A' block may vary from 1:1 to about 1:99 (or expressed as a percentage, about 50 weight percent cyclodiene down to as little as about 1 weight percent cyclodiene). Preferably the weight ratio of cyclodiene to monoalkenyl arene in each A or A' block varies from about 40:60 to about 10:90 (or about 40 weight percent cyclodiene to about 10 weight percent cyclodiene). Generally the choice of the weight ratio to be used will depend upon the desired properties needed in the block copolymer. It is desirable to keep the monoalkenyl arene or styrene content of the A and A' blocks of the polymer at 50% wt or higher to maintain oil resistance characteristics in the product block copolymer and to facilitate phase separation to enhance the strength of the block copolymer. On the other hand, higher levels of the cyclodiene in the A or A' block of the copolymer will increase the stiffness of the polymer backbone by enchaining more of the cyclodiene rings into the polymer and reducing segmental motion. Such a reduction in segmental motion will contribute to an increase in the Tg for that block which in turn will improve the upper service temperature for the block copolymer. For example, increasing the 1,3-cyclohexadiene content in a typical block copolymer of the present invention from ten (10) weight percent to thirty (30) weight percent in the A or A' block increases the $T_g$ of the end block from around +105° C. to +126° C. as measured by dynamic mechanical analysis using a Thermal Analysis DMA 2980. This compares to the +95° C. $T_g$ of the styrene block of a typical selectively hydrogenated styrene butadiene ABA block copolymer.

The first step of the process to prepare the block copolymers of the present invention is carried out by reacting a mono-functional lithium metal initiator system with the respective monomers to form a living polymer chain A—Li. The lithium metal-based initiator systems used in the first step of the process are based on lithium having the general formula M'Li wherein M' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexyllithium. The amount of the lithium metal initiator employed depends upon the desired properties of the polymer, particularly the desired molecular weight. Normally, the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, cyclopentane, isopentane, benzene and toluene. The reaction is generally carried out with a weight ratio of diluent to monomers exceeding 1. Preferably the diluent is employed in a quantity between about 200 to about 1500 parts by weight per 100 parts by weight of total monomers in the final polymer product.

An important aspect of the present invention is that the copolymerization reaction is also carried out in the presence of a non-chelating ether. The amount of non-chelating ether is also important, and will typically be in the range of 0 to 10%wt, based on the weight of the total polymerization solution, preferably about 0.05 to about 6%wt. The distribution of cyclodiene units in the styrenic copolymer is favored by the use of lower amounts of the non-chelating ether. This distribution is measured using an H-NMR method which gives the average number of 1,3-cyclodiene repeat units, N, in a copolymer chain. When N is small, the copolymer will exhibit a single $T_g$ which is preferred for making a block copolymer with an improved upper service temperature. On the other hand, the presence of the non-chelating ether increases the conversion and polymerization rate and promotes the formation of living blocks, A—Li. It is especially important in view of the presence of the 1,3-cyclodiene. If the amount of non-chelating ether is too high, the arene and cyclodiene will not polymerize in a distributed fashion, but will rather form short blocks. If no ether is present, the relative rate of termination during the cyclodiene/styrene copolymerization step is too high affording a low yield of block copolymer. The preferred level of non-chelating ether provides a balance between these opposing affects such that a block copolymer is formed having a single Tg and a higher in temperature Tg for the A blocks. Suitable non-chelating ethers include, for example, dimethyl ether, diethyl ether, di-n-butyl ether, ethyl-n-butyl ether, methyl-t-butyl ether, anisole, diphenyl ether.

The presence of the ether is also useful in controlling the microstructure or vinyl content of the diene or B block of the block copolymer. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the B copolymer block have 1,2-vinyl configuration. Preferably about 30 to about 80 mol percent of the condensed butadiene units should have 1,2-configuration. This is effectively controlled by varying the relative amount of the ether microstructure modifying agent. Additional ether, or other microstructure modifying agent, may be added after polymerization of the A block to control the microstructure of the B block.

The polymerization reaction usually occurs within a period of time ranging from a few minutes up to about 6 hours. The polymerization temperature is also important and will generally be in the range of above 10° C., preferably in the range of about 30° to about 100° C.

As used herein, "thermoplastic block copolymer" is defined as a block copolymer having at least a first block of a random copolymer of a mono alkenyl arene monomer and a 1,3-cyclodiene monomer, such as styrene and 1,3-cyclohexadiene, and a second block of a polymer of at least one acyclic conjugated diene, such as 1,3 butadiene or isoprene. The present invention includes as an embodiment a thermoplastic copolymer composition, which may be either a di-block, tri-block copolymer or multi-block composition. In the case of the di-block copolymer composition, one block is the mono alkenyl arene/cyclodiene-based random copolymer block and polymerized therewith is a second block of a polymer of an acyclic conjugated diene. In the case of the tri-block composition, it comprises, as end-blocks the glassy alkenyl arene/cyclodiene-based copolymer and as a mid-block the polymer of the acyclic conjugated diene. Where a tri-block copolymer composition is prepared, the polymer block of at least one acyclic conjugated diene can be herein designated as "B" and the alkenyl arene/cyclodiene-based random copolymer designated as "A" or "A'". The A—B—A tri-block compositions can be made by either sequential polymerization or coupling. The A—B—A' tri-block is made by sequential polymerization. In the sequential solution polymerization technique, the mono alkenyl arene and cyclodiene are first introduced to produce the random copolymer block A, followed by introduction of the acyclic conjugated diene monomer to form the mid block B, and then followed by introduction of the mono alkenyl arene and cyclodiene mixture to form the terminal block. In addition to the linear A—B—A or A—B—A' configuration, the blocks can be structured to form a radial (branched) polymer, $(A—B)_nX$, or both types of structures can be combined in a mixture. Some A—B diblock polymer can be present but preferably at least about 70 weight percent of the block copolymer is A—B—A, A—B—A' or radial (or otherwise branched so as to have 2 or more terminal resinous blocks per molecule) so as to impart strength. Still further, it is possible to prepare A—B—C block copolymers by either a sequential process or a coupling process where the C block consists of only monalkenyl arene.

Preparation of radial (branched) polymers requires a post-polymerization step called "coupling". In the above radial formula n is an integer of from 2 to about 30, preferably from about 2 to about 15, and X is the remnant or residue of a coupling agent. A variety of coupling agents are known in the art and include, for example, silicon halides, siloxanes, esters of monohydric alcohols with carboxylic acids, and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying materials. In contrast, chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

Properties of a final tri-block copolymer are dependent to a significant extent upon the resulting alkenyl arene content, cyclodiene content and acyclic conjugated diene content. It is preferred that the A block content of the tri-block and multi-block polymer copolymer be greater than about 10% weight, preferably from about 20% to about 80% weight. This means that essentially all of the remaining content is the B block, or the acyclic conjugated diene block. It is also important to control the molecular weight of the various blocks. For an AB diblock, desired block weights are 3,000 to about 60,000 for the mono alkenyl arene/cyclodiene A block, and 30,000 to about 300,000 for the conjugated diene B block. Preferred ranges are 5000 to 45,000 for the A block and 35,000 to about 250,000 for the B block. For the triblock, which may be a sequential ABA, ABA', ABC or coupled $(AB)_2$ X block copolymer, the A, A' and C blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000.

In the present invention the diene portions, both the cyclodiene and the acyclic diene, of the block copolymer are selectively hydrogenated. Hydrogenation generally improves thermal stability, ultraviolet light stability, oxidative stability, and, therefore, weatherability of the final polymer. In the present invention, hydrogenation of the cyclodiene part of the styrenic block also serves to increase the $T_g$ of that segment. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride or alkyl of a metal selected from Groups I-A, II-A and III-B of the Periodic Table of the Elements, particularly lithium, magnesium or aluminum. This preparation can be accomplished in a suitable solvent or diluent at a temperature from about 20° C. to about 60° C. Other catalysts that are useful include titanium based catalyst systems.

Hydrogenation can be carried out under such conditions that at least about 90 percent of the cyclodiene double bonds in the A and A' blocks have been reduced, at least 90% of the conjugated diene double bonds in the B block have been reduced, and between zero and 10 percent of the arene double bonds in the A, A' or C blocks have been reduced. Preferred ranges are at least about 95 percent of the cyclodiene double bonds and conjugated diene double bonds reduced, and more preferably about 98 percent of the cyclodiene and conjugated diene double bonds are reduced. Once the hydrogenation is complete, it is preferable to oxidize and extract the hydrogenation catalyst. The last step, following polymerization as well as any desired post-treatment processes, is a finishing treatment to remove the final polymer from the solvent. Various means and methods of finishing are known, and include use of steam to evaporate the solvent, and coagulation of the polymer by the addition of a non-solvent followed by filtration. The final result is a "clean" block copolymer useful for a wide variety of challenging applications, according to the properties thereof.

The polymers of the present invention may be compounded further with other polymers, oils, fillers, reinforcements, antioxidants, stabilizers, fire retardants, antiblocking agents and other rubber and plastic compounding ingredients without departing from the scope of the invention. Preferred polymers to be used in compounds with the present polymer include polyolefins such as polypropylene, polyethylene, polybutylene and the like, styrenic polymers such as crystal polystyrene, HIPS and ABS, and copolymers such as polyethylene/alpha olefins and polypropylene/alpha olefins. Preferred hydrocarbon resins are hydrogenated resins such as C5 and C9 tackifying resins. Preferred oils are paraffinic or naphthenic oils commonly referred to as mineral oils. The polymer of the present invention may be used in a large number of applications, either as a neat polymer or in a compound. In view of the high service temperatures obtained with the presently claimed polymers, desired applications include injection molded and extruded articles such as medical devices and tubing requiring sterilization. The polymer of the present invention will also be preferred for extrusion of profiles for window gaskets and other automotive applications. The polymer of the current invention may also be used for over-molding soft compounds onto more rigid polymers such as polypropylene, ABS, polystyrene, HIPS, polyesters, polyamides, polycarbonates, acrylics or other thermoplastics where the over-molded compound is required to meet elevated temperature requirements. The excellent creep properties of the invented polymer make it useful for elastic films, fibers, tapes, ribbons and fabrics formed alone, or by laminating multiple layers of films or non-woven fabrics together to form multilayer elastic materials.

The following examples are intended to be illustrative only, and are not intended to be, nor should they be construed as being limiting in any way of the scope of the present invention.

EXAMPLE 1

A series of experiments were conducted to assess the effect of a polymerization rate accelerator on the distribution of monomers in a 1,3-cyclohexadiene/styrene copolymerization. As a standard condition, the monomer ratio was set at 1,3-cyclohexadiene/styrene=30/70 (wt/wt). An attempt was made to collect samples for analysis between 1 and 2 half-lives of polymerization (50–75% conversion). All polymerizations were at 10% wt monomer in a cyclohexane or a cyclohexane plus accelerator solution and were run in a batch mode. S-BuLi was used to initiate polymerization. It was added at a level to make a final copolymer of about 10,000 g/mol.

An experiment (1-2) which employed no accelerator was conducted at 40° C. A sample taken at 58% conversion of the monomer mixture to polymer was analyzed using an H-NMR method. In this study, the degree of blockiness of the styrene (where a block of styrene is defined to be a run of more than 2 styrene units) repeat units was determined by comparing the proton integration between 6.24 and 6.85 ppm (blocky styrene) with the proton integration between 6.85 and 7.4 ppm (isolated styrene). The degree of styrene blockiness was calculated as follows:

Total moles of styrene=A/5 where A=Proton integration from 6.24 to 7.4 ppm

Moles of blocky styrene=B/2 where B=Proton integration from 6.24 to 6.85 ppm

Then, %Blocky Styrene=(B/(A+B)) times 100

The average number of styrene repeat units per styrene block, N, may be calculated from the measured value for %Blocky Styrene.

N/N+2=(%Blocky Styrene)/100

The blockiness of the 1,3-cyclohexadiene segments was measured in a similar way. For the analysis of the distribution of 1,3-cyclohexadiene segments, the total olefinic region of the H-NMR spectrum ranged from 5.0 to 5.9 ppm. The blocky 1,3-cyclohexadiene part of the signal was taken to be 5.4 to 5.9 ppm (based on H-NMR data from a control experiment using a 1,3-cyclohexadiene homopolymer (all "blocky")).

For experiment 1-1, the % Blocky Styrene was measured to be 67% of the total styrene signal for an average run length of 4 styrene monomer units. The % Blocky 1,3-Cyclohexadiene was measured to be 56% of the total 1,3-cyclohexadiene part of the signal for an average run length of 3 cyclohexadiene units. The two monomers were well distributed in this copolymer prepared with no added accelerator. The data in Table 1 were generated (varying temperature and accelerator conditions) using this technique.

From the data in Table 1, it is clear that, over the range of no added diethyl ether to 10% wt of the added rate accelerator, the distribution of the comonomers in the polymer is favored by low levels of the rate accelerator. The best result was realized with no added accelerator.

While the data is not as compelling, shorter runs of 1,3,-cyclohexadiene were observed at lower copolymerization temperatures.

A related copolymerization experiment used 18-Crown-6 as an alternate, comparative, ether as the accelerator. 18-Crown-6 is an example of a chelating ether. When this ether was used at very low levels (18-Crown-6/Li=0.25(mol/mol)) the product copolymer had average styrene run lengths of 66 units. It was highly blocky. Such a blocky copolymer will not afforded the preferred properties of a product of the current invention.

TABLE 1

Affect of added accelerator (ether) on the distribution of 1,3-cyclohexadiene and styrene in an anionic copolymerization.

| Run | [DEE] (% wt) | Temp (° C.) | Conversion (%) | Styrene Portion N | Styrene Portion % Blocky | 1,3-Cyclohexadiene Portion N | 1,3-Cyclohexadiene Portion % Blocky |
|---|---|---|---|---|---|---|---|
| 1-1 | 0 | 13 | 56 | 4 | 64 | 2 | 53 |
| 1-2 | 0 | 40 | 58 | 4 | 67 | 3 | 56 |
| 1-3 | 0.6 | 12 | 85 | 23 | 92 | 3 | 58 |
| 1-4 | 6 | 40 | 50 | 17 | 88 | 7 | 78 |
| 1-5 | 6 | 40 | 80 | 28 | 93 | 7 | 78 |
| 1-6 | 10 | 12 | 62 | 38 | 95 | 3 | 63 | where [DEE] is the concentration of diethyl ether, the rate accelerator; Temp is the temperature of the isothermal polymerization; Conversion is level of monomer consumption at the time of sampling; N is the average number of monomer units in a run; % Blocky is the portion of monomer in the polymer as sequences of more than 2 units.

EXAMPLE 2

Minimization of chain termination reactions during anionic polymerization is important to the synthesis of well-defined anionic, block copolymers. Chain termination reactions are prevalent during the unmodified, anionic, copolymerization of 1,3-cyclohexadiene and styrene. A series of experiments were conducted to study the affect of polymerization temperature and of addition of a polymerization rate accelerator on the preparation of living, anionic copolymers of 1,3-cyclohexadiene and styrene. The objective of these experiments was to find conditions where the rate of copolymerization was enhanced relative to the rates of various termination reactions.

The strategy employed in this study was to prepare anionic 1,3-cyclohexadiene/styrene copolymers under a variety of temperature and diethyl ether concentrations and then to test the "livingness" of these preparations by adding a charge of a second anionic monomer (butadiene or styrene). Polymers that were living at the time of the second monomer addition would continue to polymerize and increase in MW. Those that were dead would not add the second monomer and would not increase in MW. In this way, living and dead polymers could be sorted by separating the products according to MW (GPC).

In a typical experiment (2-3), a 70/30 (wt/wt) mixture of styrene/cyclohexadiene in cyclohexane (10% wt monomers) was prepared under anionic polymerization conditions. Dry diethyl ether, DEE, a polymerization rate accelerator, was added with stirring at a level to give a concentration "[DEE]"=0.6% wt. The solution was cooled to 12° C. and sufficient s-BuLi was added to make a living anionic copolymer having MW=10,000. When the Step I copolymerization was complete, a second charge of monomer was added to initiate the second step of polymerization. The Step II monomer was styrene; it was added in a slight excess of the weight of the original monomer charge (1,3-cyclohexadiene+styrene) (Step II monomer charge/Step I monomer charge=1.27 (wt/wt)). The Step II polymerization was allowed to proceed to completion. When all of the Step II monomer had been consumed, the living diblock copolymer was terminated by the addition of MeOH. Analysis of the final product by GPC found two components; a higher MW species from crossover of the Step I product to the Step II polymerization (polymer that was living at the time of addition of the Step II monomer charge) and a lower MW component which was Step I copolymer which did not crossover to the homopolymerization of styrene (polymer that was dead from termination reactions before the addition of the Step II monomer). Based on a GPC Refractive Index detector response, the higher in MW peak accounted for 93% of the area under the GPC curve;the lower in MW peak accounted for the remaining 7% of the area under the curve. These area percentages were taken to be equal to the relative wt % composition of the polymer mixture. Only 7% wt of the product was Step I copolymer. From this GPC analysis and the relative sizes of the two monomer charges, the molar portion of chains that were living at the time of addition of the Step II monomer charge was calculated to be 84 mol %. Only 16 mol % of the chains had suffered chain termination reactions during the 1,3-cyclohexadiene/styrene copolymerization. The combination of a low polymerization temperature and an added polymerization rate accelerator, diethyl ether, afforded effective conditions for the preparation of a living 1,3-cyclohexadiene/styrene copolymer.

Similar experiments at other Step I polymerization temperatures and other diethyl ether concentrations afforded the data in Table 2. In some examples, butadiene was used instead of styrene as the Step II monomer. It is unlikely that the change in the Step II monomer type had an affect on the results of the study of the amount of living Step I polymer that was present at the time of addition of the second step monomer.

From analysis of the data in Table 2, it is clear that both temperature and added diethyl ether affect the rate of. copolymerization of 1,3-cyclohexadiene/styrene relative to the rate of various termination reactions. In the absence of diethyl ether, the level of termination in the Step I product was unacceptable for a block copolymer preparation at either of the temperature conditions studied. Much improved results were obtained at all levels of added diethyl ether that were tested. The best result was obtained at the lower level of added diethyl ether. A lower polymerization temperature also favored the preparation of a living copolymer.

TABLE 2

Affect of added accelerator (ether) on the reduction of termination in the living anionic copolymerization of 1,3-cyclohexadiene and styrene.

| Run | [DEE] (% wt) | Temp (° C.) | Step II Monomer | Terminated Chains (mol %) |
|---|---|---|---|---|
| 2-1 | 0 | 15 | Butadiene | 93 |
| 2-2 | 0 | 40 | Butadiene | 91 |
| 2-3 | 0.6 | 12 | Styrene | 16 |
| 2-4 | 6 | 12 | Butadiene | 21 |
| 2-5 | 6 | 12 | Butadiene | 30 |
| 2-6 | 6 | 40 | Styrene | 50 |
| 2-7 | 10 | 12 | Styrene | 20 |

EXAMPLE 3

A series of experiments were conducted to determine the affect of well distributed 1,3-cyclohexadiene content (%wt) on the glass transition temperature (Tg) of a copolymer with styrene. An homopolymer of 1,3-cyclohexadiene was prepared (experiment 3-1) by anionic polymerization in a mixed diethyl ether/cyclohexane (6/94 (wt/wt)) solvent at 40° C. (5% polymer in the product cement). An aliquot of the polymer was isolated and analyzed by H-NMR to have MW=7,400. Analysis of the dried polymer by Differential Scanning Calorimetry (DSC) found the Tg of the homopolymer to be 174° C. The remainder of the living polymer cement was terminated and hydrogenated (experiment 3-2) using the Ni/Al technique described in Example #4. After hydrogenation, 91% of the C=C centers present in the starting poly-1,3-cyclohexadiene had been saturated. The hydrogenated polymer was extracted, washed, stabilized and recovered as outlined in Example #4. Analysis of the dry, hydrogenated polymer by DSC found Tg=199° C. Polystyrene in this molecular weight range would have a Tg around 95° C. For a copolymer of styrene and 1,3-cyclohexadiene, where the 1,3-cyclohexadiene is well distributed, it may be possible to forecast the Tg of the copolymer from the weight fraction of the two monomers present in the copolymer. For example, Tg=X (174° C.)+(1−X) (95° C.) where X is the weight fraction of 1,3-cyclohexadiene in the copolymer. In a test of this concept, a copolymer of cyclohexadiene and styrene was prepared in a mixed diethyl ether/cyclohexane (6/94 (wt/wt)) solvent at 40° C. (5% polymer in the final product cement). When polymerization was complete, MeOH was added to terminate the living polymer. An aliquot of the cement was concentrated and analyzed by H-NMR; the weight fraction of 1,3-cyclohexadiene in the copolymer was found to be 0.20. From the equation outlined above, the calculated Tg for the copolymer would be 111° C. In good agreement with this calculation, the Tg as measured by DSC for this copolymer was 110° C.

In a similar manner, the Tg for a selectively hydrogenated copolymer having the hydrogenated 1,3-cyclohexadiene well distributed in the styrenic copolymer may be forecast by the relationship: Tg=X (199° C.)+(1−X) (95° C.) where X is the weight fraction of the hydrogenated 1,3-cyclohexadiene in the copolymer. In a test of this concept, the data for the selectively hydrogenated block copolymer described in Example #4 were used. The end block of the copolymer had a weight fraction of hydrogenated 1,3-cyclohexadiene of 0.31. By calculation, the Tg of the styrenic copolymer end block should be 127° C. As noted in Example #4, the Tg for the end block of the hydrogenated copolymer was measured by DSC to be 129° C. The measured value is in good agreement with the value calculated using the weight fraction of the hydrogenated 1,3-cyclohexadiene in the styrenic copolymer end block. This constitutes further evidence that the 1,3-cyclohexadiene segments are well distributed in the copolymer.

EXAMPLE 4

In this example a block copolymer according to the present invention was prepared by first forming a distributed block of styrene and 1,3-cyclohexadiene, then forming a homopolymer block of 1,3-butadiene, and coupling the resulting diblock with tetramethoxysilane. To prepare the polymer the following reactants were charged under nitrogen, by weight, to a stainless steel pressure reactor with approximately 20-gallon capacity: 35.83 kg of cyclohexane, 1.32 kg of styrene (one half of the total charge), 0.27 kg of diethyl ether, and 1.32 kg of 1,3-cyclohexadiene. The temperature of the reactor was approximately 15° C. Sec-butyllithium in cyclohexane solution (approximately 11% wt.) was added dropwise to the solution in the reactor until a red-orange color indicative of the presence of polystyryl-lithium anion persisted. The quantity of sec-butyllithium solution required for titrating out the anionic polymerization terminating impurities in the solution was 15 ml. Polymerization was initiated by the addition of 230 ml of sec-butyllithium solution (251 mmol). When about half of the monomers had polymerized, the remaining 1.32 kg of styrene was added. The polymerization was allowed to proceed until essentially all of the monomer was consumed affording a living A block having 1,3-cyclohexadiene units distributed in the styrene polymer. A small aliquot of this solution was removed for analysis and terminated with MeOH. Analysis by Gel Permeation Chromatography (GPC) found a single species having molecular weight (MW) of 15,200 g/mol (basis polystyrene calibration). Analysis using a H-NMR technique found the copolymer to contain styrene and 1,3-cyclohexadiene in a ratio of 69/31 (wt/wt) respectively.

A portion of the Step I polymer cement (14.95 kg of the living polymer solution, 94 mmol of living chain ends) was transferred at 15° C. to a second pressure reactor to initiate the second step of the polymerization. The second reactor contained 28.93 kg cyclohexane, 2.91 kg diethyl ether, and 3.5 kg butadiene. The solution in the second reactor had been titrated for impurities with sec-butyllithium solution. The Step II polymerization reaction was allowed to proceed to completion affording a living AB-Li living diblock copolymer cement where the A block contains a distribution of 1,3-cyclohexadiene in styrene and the B block is a butadiene homopolymer segment. A small aliquot of this product was removed for analysis and terminated with MeOH. Analysis by GPC found the diblock copolymer to have MW=47,700 g/mol. From H-NMR analysis of this product, it was determined that 37% of the butadiene had been inserted into the product via 1,2-addition; the remainder was added via 1,4-insertion The remainder of the living Step II polymer cement was coupled at 17° C. using tetramethoxysilane (TMSi)(10.31 g, 68 mmol). Reaction over night afforded a highly coupled polymer product (over 92% coupled) less than 8%wt of the polymer was left as an uncoupled diblock copolymer. Analysis by GPC found the coupled product to be mostly 3-arm (87%wt) and 4-arm (13%) branched polymers; only a trace of the two arm, linear polymer was noted.

The unsaturated, coupled block copolymer was transferred to another pressure reactor for hydrogenation. The polymer cement was heated to 55° C. with stirring and treated with hydrogen (700 psig). A nickel octanoate/triethylaluminum catalyst was added at such a level as to make the concentration of Ni in the polymer cement about 15 ppm. After 155 minutes of reaction, an analytical sample of the hydrogenated cement was collected and analyzed by H-NMR for the presence of unhydrogenated C=C centers. The H-NMR analysis found that 98.1% of the C=C sites had been saturated. The hydrogenation reaction was allowed to proceed overnight. Analysis the following day found that 99.8% of the C=C centers had been hydrogenated. Essentially all of the C=C sites coming from the polymerization of 1,3-cyclohexadiene and 1,3-butadiene had been hydrogenated.

The hydrogenation catalyst residues were oxidized and extracted by contacting the cement with an aqueous solution of phosphoric acid (3%wt) in a diluted oxygen/nitrogen atmosphere. Care must be exercised in this step to avoid the formation of an explosive mixture of oxygen, hydrogen, and hydrocarbon; appropriate dilution of this vapor phase with nitrogen is important. The extracted cement was washed with water to remove phosphoric acid residues. The clean cement was stabilized by the addition of an antioxidant (Irganox 1010, 0.1% wt basis polymer). The polymer was recovered by steam stripping in a cyclone devolatilizer. About 10 pounds of the desired $(AB)_nX$ block polymer were recovered where the A block was a hydrogenated random 1,3-cyclohexadiene/styrene copolymer (MW=15,200 g/mol), B was an hydrogenated butadiene (ethylene/butylene) segment (MW=32,500 g/mol), n=2(trace), 3, and 4, and X=Si. About 8% of the product was the uncoupled AB diblock copolymer where the A block was a random 1,3-cyclohexadiene/styrene copolymer (MW=15,200 g/mol) and B was an hydrogenated butadiene (ethylene/butylene) segment (MW=32,500 g/mol). A trace of the linear dimer, ABA, was noted.

Following hydrogenation various tests were conducted on the polymer. The polymer, designated P-1, had a $T_g$ of −38° C. associated with the B block and a $T_g$ of +129° C. associated with the A block. This compares with a $T_g$ of −41° C. for the B block and a $T_g$ of +101° C. for the A block in KRATON G 1650, a conventional selectively hydrogenated SBS block copolymer.

Tensile properties according to ASTM Test Method #D412 were measured on P-1 (according to the invention), and on KRATON G 1650 (for comparison), as well as for a 50/50 blend of KRATON G 1650 and P-1. The results, shown in FIG. 1, reveal that the polymer of the present invention compares favorably to the conventional polymer at room temperatures. Next the polymers were compared at elevated temperatures. Tensile properties were measured at 75–80° C. for P-1, KRATON G 1650 and for KRATON G 1651. KRATON G 1651 is also a selectively hydrogenated SBS block copolymer, like G 1650, but has a much high molecular weight (around 285,000 for G 1651 compared to 110,000 for G 1650). As shown in FIG. 2, KRATON G 1650, a polymer of comparable molecular weight to P-1, had a tensile strength of 262 psi and a breaking elongation at around 175% as compared to 1,100 psi strength and 650% elongation for P-1. Comparing P-1 and G 1651, it is seen that P-1 according to the invention has better retention of tensile properties at elevated temperature even when compared to a much higher molecular weight polymer, G-1651.

The creep properties of P-1 were compared with those of G-1650 using a Thermal Analysis DMA 2980. A stress of 0.1 mega Pascals was applied to a film at a specified temperature for 10 minutes. During the hold time the slope of the elongation vs. time curve was determined as a measure of the rate of creep. This experiment was then repeated at temperatures from room temperature to 140° C. as shown in table 3 and FIG. 3. As shown in the table, when the same stress (0.1 MPa) was applied at various temperatures, P-1 withstood temperatures as high as 140° C., compared to only 100° C. for G 1650. It was also found that the creep rate for P-1 was lower than G 1650. The same pattern was observed when various stresses were applied at the same temperature (25° C.)—i.e., lower creep rate for the cyclohexadiene polymer according to the present invention.

TABLE 3

| CREEP TEST AT 0.1 MPa Of P-1 and G1650 | | |
|---|---|---|
| Temperature Degrees C. | Creep Rate Of G-1650 %/min. | Creep Rate of P-1 %/min. |
| 25 | 0.0054 | 0.0016 |
| 40 | 0.011 | 0.01 |
| 60 | 0.030 | 0.020 |
| 80 | 0.14 | 0.036 |
| 100 | 0.42 | 0.068 |
| 120 | Failed | 0.13 |
| 140 | Failed | 0.33 |
| CREEP TEST AT 25C OF G1650 and P-1 | | |
| Stress MPa | Creep Rate Of G-1650 %/min. | Creep Rate of P-1 %/min. |
| 0.1 | 0.0054 | 0.0016 |
| 0.2 | 0.014 | 0.0073 |

TABLE 3-continued

| | | |
|---|---|---|
| 0.5 | 0.048 | 0.023 |
| 1 | 0.12 | 0.075 |
| 2 | 1.14 | 0.55 |

EXAMPLE 5

A 15.22 kg (96 mmol of living polymer chain ends) portion of the living A block copolymer from Step I of the preparation described in Example #4 was transferred to a second reactor to prepare an ABC polymer by sequential anionic polymerization where the A block was styrene polymer having 1,3-cyclohexadiene polymerized into it in a well distributed manner, the B block was prepared from the polymerization of 1,3-butadiene, and the C block was a styrene homopolymer. This polymer was subsequently selectively hydrogenated to remove the non-aromatic C=C unsaturation affording a new styrenic ABC block copolymer having improved upper service temperature performance.

The second reactor contained the reagents for making the B block. A solution containing 6.94 kg of butadiene, 2.92 kg of diethylether, and 25.32 kg of cyclohexane was titrated with s-BuLi to remove anionic polymerization terminating impurities. As soon as the living polymer cement from the Step I reactor was transferred to the solution in the second reactor anionic polymerization was initiated (16° C.). When the butadiene monomer had been consumed by the polymerization reaction, a small sample of the AB—Li cement was collected for analysis and terminated by the addition of MeOH. Analysis by GPC found the diblock copolymer MW=86,000 g/mol. The same sample was analyzed by H-NMR; 41% of the butadiene had polymerized by 1,2-addition the rest had added by 1,4-insertion.

Styrene monomer (1.5 kg) was added to the living AB—Li cement to initiate polymerization of the C block. When the styrene monomer had been consumed by polymerization, MeOH was added to the reactor to terminate the living polymer cement. Analysis of the new ABC block copolymer by GPC found MW=99,100 g/mol.

The unsaturated, block copolymer was hydrogenated using the Ni/Al technique described in Example #4. The complete but selective hydrogenation resulted in conversion of 99.3% (basis H-NMR analysis) of the C=C bonds derived from the polymerization of 1,3-cyclohexadiene and butadiene and essentially none of aromatic centers coming from the incorporation of styrene into the block copolymer. The hydrogenation catalyst was oxidized, the polymer cement was washed and the polymer recovered and stabilized using the procedures described in Example #4. The desired ABC polymer was recovered (21 lb.) as a white crumb.

EXAMPLE 6

A compound was prepared containing polymer P-1, polypropylene, oil and a stabilizer. A dry blend of 3.11 lbs. P-1, 2.60 lbs. Penreco 4434 oil, 1.29 lbs. PP3622 and 0.01 lbs. Irganox 1010 were fed into a Berstorff twin screw extruder. The resulting pellets were injection molded into ⅛-inch thick plaques for testing. The quality and surface finish of the resulting plaques was excellent. The plaques had the following properties:

| | |
|---|---|
| Hardness | 63.5 Shore A |
| Compression set at 70° C. | 87.2% |
| Tensile Strength at 50° C. | 372 psi |
| Tensile elongation at 50° C. | 357% |
| 100% Modulus at 50° C. | 321 psi |

What is claimed:

1. A hydrogenated block copolymer having a hard phase and a soft phase, the general configuration being

A—B,

A—B—A,

A—B—A',

A—B—C or (A—B)$_n$X, where n is an integer from 2 to about 30, and X is coupling agent residue and wherein a. prior to hydrogenation each A and A' block is a random copolymer block of a mono alkenyl arene monomer and a 1,3-cyclodiene monomer, each B block is a polymer block of at least one acyclic conjugated diene and each C block is a polymer block of a mono alkenyl arene;

b. subsequent to hydrogenation about 0–10% of the arene double bonds have been reduced, at least about 90% of the conjugated diene double bonds have been reduced, and at least about 90% of the 1,3-cyclodiene double bonds have been reduced;

c. each A, A' and C block having an average molecular weight between about 3,000 and about 60,000 and each B block having an average molecular weight between about 30,000 and about 300,000;

d. the weight ratio of the alkenyl arene monomer and the cyclodiene monomer in each A and A' block prior to hydrogenation is between 1:1 to 99:1;

e. the total amount of A plus A' plus C blocks is about 10 percent weight to about 80 percent weight of the block copolymer; and f. the glass transition temperature of the hard phase of the block copolymer is in excess of 105 degrees Celsius.

2. The block copolymer according to claim 1 wherein said mono alkenyl arene is styrene, said acyclic conjugated diene is selected from the group consisting of 1,3-butadiene and isoprene, and said 1,3-cyclodiene monomer is selected from the group consisting of 1,3-cyclohexadiene, 1,3-cycloheptadiene and 1,3-cyclooctadiene.

3. The block copolymer according to claim 2 wherein said acyclic conjugated diene is 1,3-butadiene and said cyclodiene is 1,3-cyclohexadiene.

4. The block copolymer according to claim 3 wherein the 1,3-butadiene in the B block has a 1,2-vinyl content of 20 to 80 mol percent prior to hydrogenation.

5. The block copolymer according to claim 4 wherein the weight ratio of alkenyl arene monomer to cyclodiene monomer in the A block and A' block prior to hydrogenation is between 90:10 and 60:40.

6. The block copolymer according to claim 5 wherein the hard phase has a glass transition temperature of between about plus 105 degrees Celsius and plus 165 degrees Celsius and the soft phase has a glass transition temperature of less than minus 20 degrees Celsius as measured by dynamic mechanical analysis.

7. The block copolymer according to claim 5 wherein said hydrogenated block copolymer has a general configuration of A—B—A or A—B—A'.

8. The block copolymer according to claim 5 wherein said hydrogenated block copolymer has a general configuration of $(A-B)_nX$, where n is an integer from 2 to 6.

9. The block copolymer according to claim 5 wherein said hydrogenated block copolymer has a general configuration of A—B—C.

10. The block copolymer according to claim 7 wherein said A and A' blocks have a molecular weight of about 5,000 to about 45,000, and said B block has a molecular weight of about 35,000 to about 250,000.

11. The block copolymer according to claim 10 wherein the 1,2-vinyl content of the 1,3-butadiene in the B block is 30 to 80 mol percent prior to hydrogenation.

12. The block copolymer according to claim 9 wherein said A and C blocks each have a molecular weight of about 5,000 to about 45,000 and said B block has a molecular weight of about 35,000 to about 250,000.

13. The block copolymer according to claim 1 wherein the average number of consecutive cyclodiene repeat units, N, in the A and A' copolymer blocks is less than 10.

14. The block copolymer according to claim 13 wherein the average number of consecutive cyclodiene repeat units, N, in the A and A' copolymer blocks is less than 5.

15. An elastomeric article comprising the hydrogenated block copolymer of claim 1 and, optionally, at least one other polymer selected from the group consisting of polyolefins, polyphenylene oxides, and styrenic resin.

16. A formulated elastomeric article comprising the hydrogenated block copolymer of claim 1 and at least one component selected from the group consisting of fillers, reinforcements, polymer extending oils and polyolefins.

17. The elastomeric article according to claim 15 wherein the article is injection molded or extruded into a tube or medical device.

18. The elastomeric article according to claim 16 wherein the article is an extruded profile for gasketing.

19. The elastomeric article according to claim 16 wherein the elastomeric compound is molded onto another thermoplastic article selected from the group consisting of HIPS, ABS, polycarbonates, polyphenylene oxides, polypropylenes, polyamides, and polyesters.

20. An elastomeric fabric or film wherein the formulation according to claim 16 forms the elastic layer in a multilayer construction with other films or nonwoven layers.

* * * * *